United States Patent [19]

Mastroianni

[11] Patent Number: 4,610,086

[45] Date of Patent: Sep. 9, 1986

[54] DRIVE NOTCHING TOOL

[76] Inventor: Dominic M. Mastroianni, 1933 Sunbury Rd., Baltimore, Md. 21222

[21] Appl. No.: 713,646

[22] Filed: Mar. 19, 1985

[51] Int. Cl.⁴ .............................................. B26B 13/00
[52] U.S. Cl. ....................................... 30/135; 30/229; 30/252
[58] Field of Search ................. 30/124, 131, 132, 133, 30/134, 135, 178, 229, 252

[56] References Cited

U.S. PATENT DOCUMENTS

| | | | |
|---|---|---|---|
| 451,601 | 5/1891 | Raughtigan | 30/135 |
| 4,106,195 | 8/1978 | Berg | 30/229 X |
| 4,227,305 | 10/1980 | Newman | 30/229 |

*Primary Examiner*—E. R. Kazenske
*Assistant Examiner*—Michael D. Folkerts
*Attorney, Agent, or Firm*—John F. McClellan, Sr.

[57] ABSTRACT

A hand tool for sheet metal workers notches and soft-noses an end of a sheet metal drive in one operation, and saves time and prevents injuries as compared with use of tin snips to do the same job. Paired handles of the tool are held in one hand while, with the other hand, the end of a sheet metal drive is slid onto an upper plate and against a stop. The upper plate, a lower plate fixed to it, and a blade shaped to engage portions of the periphery of the upper and lower plates form a shear in which a lower plate fixed in parallel spaced relation to the upper plate serves to support a portion of the drive. Shape of the shear causes the drive to be notched and soft-nosed with a squeeze of the handles.

2 Claims, 5 Drawing Figures

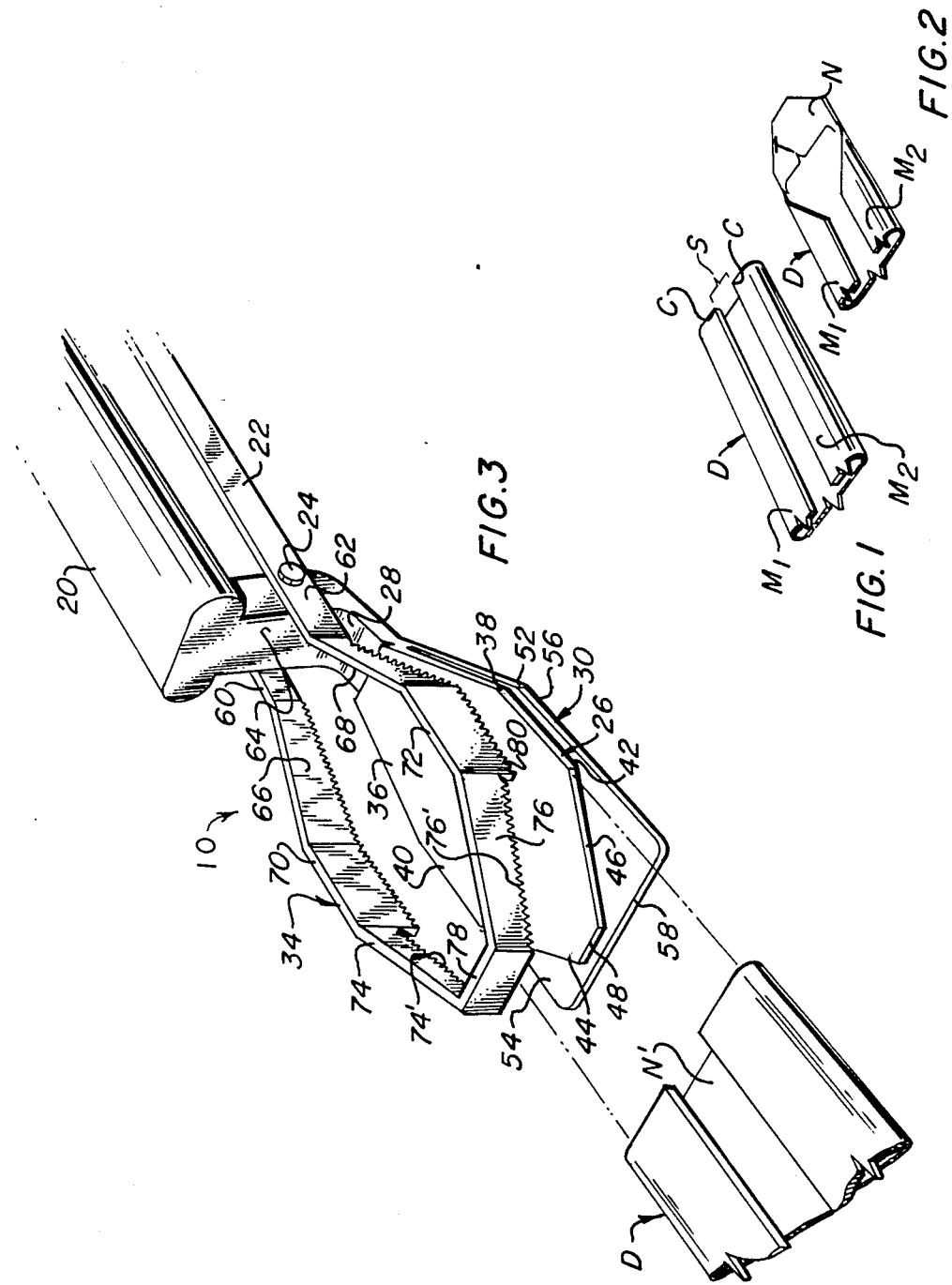

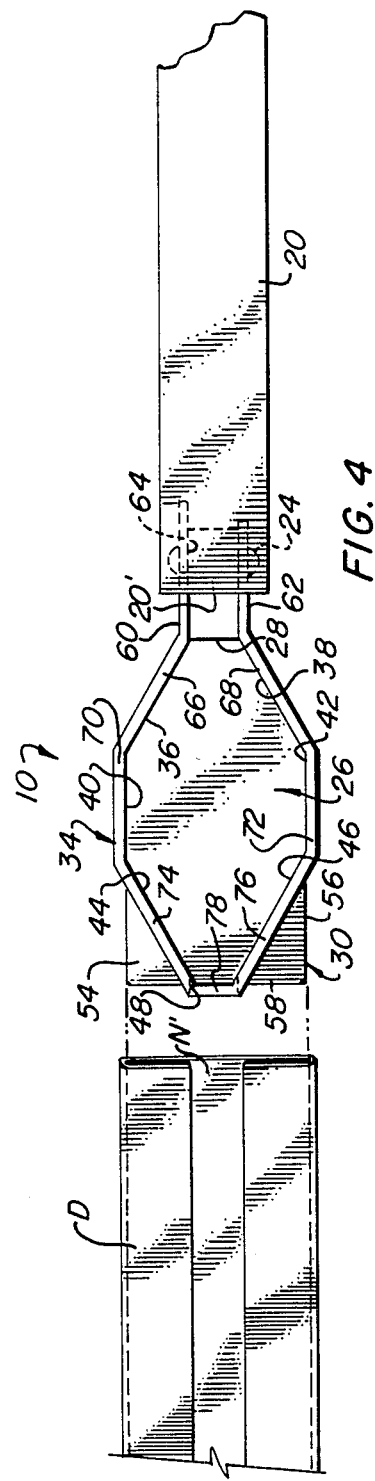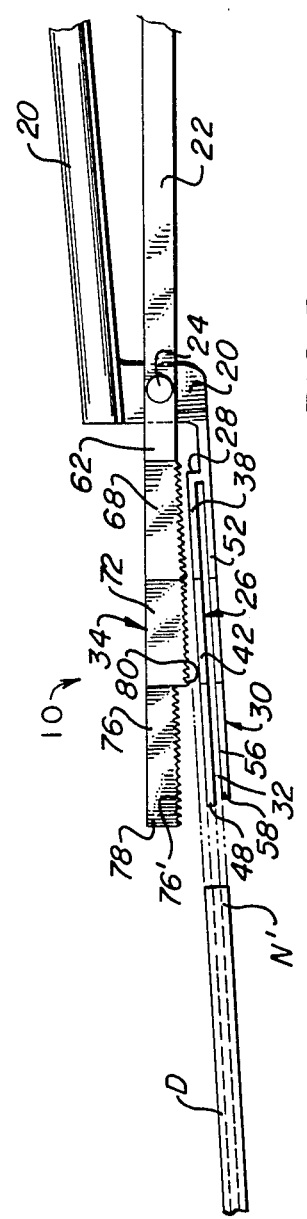

DRIVE NOTCHING TOOL

FIELD OF THE INVENTION

This ivention relates generally to hand tools and particularly to hand tools for working sheet metal.

BACKGROUND OF THE INVENTION

In joining lengths of sheet metal duct butt to butt, opposed pairs of hook-flanges, called drive edges and fashioned on the ends of the ducts, are connected with drives. A drive is a pre-formed sheet metal strap with the long margins symmetrically folded in plane with each other to form an exaggeratedly thin flattened "C"-section. In a typical tight-fit application, just enough space or slot remains between the folded-over margins of the "C"-section to permit uniting the drive edges by sliding the drive along them from one end to the other, sometimes by hammering on a bend end of the drive in the manner of driving a stake. Any space between the ends of the pieces of duct is usually eliminated by the drawing together of the ends by the drive.

To permit one of the drive ends to be bent over after installation so that the drive is held in place at the ducts regardless of vibration or accidental impact, the ends of the folded-over margins are trimmed back with sheet metal snips to leave a single thickness or soft nose an inch or so long at the end, and the corners of this soft-nose are snipped to leave a blunt wedge shape.

To assure easier engagement of the folded over margins with the drive edges, an open throat is formed at the snipped-back ends of the margins by snipping off the corners at the ends of the folded over margins.

Both procedures take time and both cause injury to sheet metal workers from the sharp edges.

SUMMARY OF THE INVENTION

A principal object of this invention therefore is to provide a portable system in the form of a hand tool that in one operation, with one squeeze of the handles, both notches and soft noses an end of a sheet metal drive.

FUrther objects are to provide a system as described that is safe, quick and convenient in use, is durable, economical and easy to learn to use, and that produces finished work of uniform high quality.

BRIEF DESCRIPTION OF THE DRAWINGS

The above and other objects and advantages of this invention will become more readily apparent on examination of the folowing description, including the drawings in which like reference numerals refer to like parts.

FIG. 1 is a perspective view of an end of a typical drive, before notching and soft nosing;

FIG. 2 is a perspective view of the end of the drive after notching and soft nosing;

FIG. 3 is a perspective view of a preferred embodiment of the invention;

FIG. 4 is a plan view thereof; and

FIG. 5 is a side elevational view thereof.

DETAILED DESCRIPTION

FIG. 1 shows a portion of a typical drive D before notching and soft nosing. A flattened "C"-shaped cross-section results from turning the long margins $M_1$, $M_2$, of a strip inward towards each other so that they lie in the same plane, with a slot S between.

The square end is inconvenient to force along flanges of abutting ducts which the drive is intended to untie. The corners C may dig in, resisting assembly and scarring the ducts.

After the duct is installed, the protruding end of the drive not already bent, and which is made opverlong for the purpose, is bent against the duct to keep the drive in place and improve sealing.

Bending the double thickness of metal (20 to 28 gauge, for example) can be awkward.

Therefore, one end of each drive is preferably notched and soft-nosed.

FIG. 2 shows an end of a drive D, soft-nosed at N by having the corners cut off the ends of the margins $M_1$, $M_2$ on forty-five degree angles to produce an open of "Y"-shaped throat T. This throat helps the drive draw the ends of ducts together on assembly.

Ordinarily, to soft nose and notch drives in this manner, the sheet metal worker trims them with his tin snips, usually producing jagged edges in the process.

FIGS. 3-5 show the invention in embodiment 10, with portions if drive D in position for insertion. The embodiment is substantialy symmetrical about the long centerline. First and second handles 20, 22 cross each other at a pivot 24.

On the forward end of the first handle a first or upper plate 26 is affixed, as by welding to a flange 28, that acts also as a stop for drives on insertion.

A second or lower plate 30 is affixed to the upper plate 26, in parallel spacing below it, as by welding at the handle end.

The upper plate 26 is proportioned for fitting inside the end of a drive. The drive is inserted in the system slotted-side up.

The spacing 32 between the upper and lower plates is proportioned for receiving and supporting the lower part N', or part opposite the slotted part, of a drive when the upper plate is inside the drive.

Forwardly extending from the forward end of the second handle 22 is a member 34 with a shape proportioned for co-acting in a shearing action when the first plate and the second plate, which are shaped for the purpose, to notch and soft-nose the drive when the handles are moved towards each other.

The first plate plan-view shape includes: first and second outwardly diagonal edges 36, 38 that diverge from the first handle, first and second parallel edges 40, 42 first and second inwardly diagonal edges 44, 46. The front edge 48 of the first plate extends transversely from one of the inwardly diagonal edges to the other and can be, but need not be, a cutting edge, Member 34 or the coacting shearing portion that extends forward from the second handle has in plan view a polygonal ring shape that slides down past the first plate edges at 36, 38, 40, 42, 44, 46 and the edges 52, and part of the edges 54, 56 of the second plate, when the handles are squeezed.

The second or lower plate 30 has fixed attachment to the upper plate 26 at flange 28 and has the edges 52, 54, 56 congruent with the upper plate edges 36, 38, 40, 42 with exceptions. The exceptions are that the lower plate is shorter, and is rectangular at the front end so that the corners between the front edge 58 and the parallel edges 54, 56 protrude beyond the upper plate edges 44, 46.

The forward end of the second handle 22 has arms 60, 62, on respective sides of an end slot 64 that permits the pivoted, upright portion 20' of the first handle to pass. The arms 60, 62 continue forward to respective integral connection with the first and second diverging blade portions 66, 68 that in turn similarly connect at the forward ends to respective parallel blade prtions 70, 72, that then similarly connect at the forward ends to respective converging blade portions 74, 76.

A transverse bar 78 similarly connects the forward ends of the converging blade portions. The lower edges of all blade portions may be squared-off and are cutting edges. They may have serrations 80 for better cutting. All blade portions are preferably straight. The converging blade portions 74, 76 have cutting edges 74', 76' that are upwardly recessed by a distance somewhat exceeding the thickness of the thickest metal to be cut. The corners at 54, 58, (FIG. 4) on each side of the lower plate that protrude beyond the respective diagonal edges 44, 46 of the upper plate permit the recessed portions to shear the notch in the upper portion of the drive without also cutting the portions of the drive below the notched portions.

It will be appreciated that the open loop shape of the blade portion 34 permits resilient fit to the lower plate perimeter and gives a good view of the work and space for cut portions to be shaken out.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. A system for one-operation notching and shaping as a soft nose a pre-formed flattened "C"-section sheet metal drive that consists of an elongate flat lower portion having first and second longitudinal upwardly inturned margins with respective edges defining a slot between them and above said lower portion, said system including a first handle and a second handle with respective forward ends, means for pivotally connecting said first and second handles for movement towards each other, a first plate on the forward end of the first handle, a second plate fixed below the first plate with a spacing therebetween proportioned for receiving a said lower portion of a sheet metal drive for shaping as a soft nose, means on an end of the second handle with a shape for coacting in a shearing action with a shape of the first plate and of the second plate and forming a notch in said margins and for removing said margins between the notch and said end of a flattened-"C"-section sheet metal drive, when said first and second handles are moved towards each other about said means for pivotally connecting, said shape of the first plate including: first and second outwardly diagonal edges diverging from the first handle, for shaping a said soft nose by removing part of said lower portion, substantially parallel first and second edges extending forwardly from the first and second diagonal portions, for said removing of margins, and first and second inwardly diagonal edges converging from the respective substantially parallel first and second edges for said forming of a notch.

2. A system as recited in claim 1, means for limiting said first and second inwardly diagonal edges to said forming of a notch when said first and second handles are moved towards each other, comprising said second plate having protrusion beyond said first plate for limiting said shearing action.

* * * * *